Patented Nov. 6, 1934

1,979,614

UNITED STATES PATENT OFFICE

1,979,614

HALOGENATED ETHANOL

Erich Goth, Wuppertal-Elberfeld, Friedrich Kayser, Wuppertal-Hammerstein, and Martin Kühn, Wuppertal-Elberfeld, Germany, assignors to Winthrop Chemical Company, Inc., New York, N. Y., a corporation of New York No Drawing. Application March 17, 1933, Serial No. 661,416. In Germany March 23, 1932

10 Claims. (Cl. 260—156)

The present invention relates to halogenated ethanols which simultaneously contain chlorine and bromine at the same carbon atom, more particularly it relates to halogenated ethanols of the general formula:

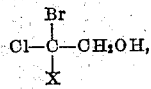

wherein X stands for chlorine or bromine. The invention further relates to a process of preparing the new mixed-halogenated ethanols.

In accordance with the present invention new products which distinguish by a remarkable narcotic action are obtainable by the production of chloro-bromo-ethanols containing the halogens at the same carbon atom. The new chloro-bromo-ethanols are prepared by acting upon a chloro-bromoacetaldehyde with a reducing agent. As the reducing agent advantageously metal alcoholates, preferably aluminium alcoholates, are employed. Apparently the metal alcoholates effect the reduction process by a catalytic action since it is not necessary to introduce equivalent quantities of the metal alcoholates into the reaction if alcohols are employed as solvent. The process proceeds, for instance, according to the following reaction scheme:

$$Br_2ClC-CHO+H_2 \rightarrow Br_2ClC-CH_2OH.$$

The hydrogen involved in this reaction is supplied by an alcohol present as solvent or also by the alcohol radical present in the metal alcoholate, the alcohols transforming for their part into the corresponding carbonyl compounds. The reduction process may be performed also without any solvent or in the presence of an inert solvent.

Instead of the alcoholates of the metals themselves also alcoholates of partially halogenated polyvalent metals can be used, for instance, chloromagnesium alcoholates of the formula ClMgOR, or chloroaluminium alcoholate of the formula ClAl(OR)$_2$, R representing an alkyl group.

For carrying out the process the reacting components are advantageously gradually mixed while stirring and cooling. We prefer to use an alcohol as solvent, but also others, such as benzene, may be employed. The reaction mixture is heated while distilling off the solvent and continually replacing it if an alcohol is used as the solvent. By this distillation process the aldehyde or ketone formed in the reaction is removed.

The chloro-bromo-ethanol formed is obtained from the mixture after removal of the solvent by decomposing the reaction mixture by a dilute mineral acid, and by extraction with a solvent which is insoluble in water. A purification may be effected by first subjecting the reaction mixture after the decomposition with the dilute mineral acid to a steam distillation and then extracting the chloro-bromo-ethanol from the distillate. Finally, the chloro-bromo-ethanol may be purified by fractional distillation or by recrystallization.

In further development of the invention described above it has been found that the chloro-bromo-acetaldehydes can also be reduced by the action of the alkyl compounds of metals or metal halogenides, such as an aluminium trialkyl or dialkyl aluminium halogenide, for instance, in accordance with the following equation:—

$$2Br_2ClC-CHO+ClAl(C_2H_5)_2 \rightarrow$$
$$(Br_2ClC-CH_2O-)_2AlCl+2CH_2=CH_2$$

$$(Br_2ClC-CH_2O-)_2AlCl+2H_2O+2HCl \rightarrow$$
$$2Br_2ClC-CH_2OH+AlCl_3+2H_2O$$

Instead of the chloro-bromoacetaldehydes mentioned above derivatives of these compounds, for instance, their acetals or acyl derivatives may be employed. Esters of the bromo-chloro-ethanols if primarily formed in such a reaction are subsequently saponified in the above manner.

It is a surprising fact that the new halogenated ethanols containing simultaneously chlorine and bromine at the same carbon atom display a higher narcotic effect than the tri-bromoethanol, since the trichloroethanol used in the form of its urethane as a sedative has a less narcotic effect than the corresponding tri-bromo compound used as a rectal narcotic. From this fact it was to be expected that the substitution of bromine in the tribromoethanol by chlorine would lessen the narcotic effect of the tribromoethanol.

The new chloro-bromo-ethanols have the further advantage that they are more soluble in water than the tribromo-ethanol, which property facilitates their use in the medicinal practice. The chloro-bromo-ethanols are soluble in the usual organic solvents, such as ether, alcohols, acetone, benzene and the like. They can be distilled in vacuo without decomposition in the form of colorless liquids which solidify on cooling.

The invention is further illustrated by the following examples without being restricted thereto:

*Example 1.*—253 grams of bromodichloroacetaldehyde are added drop by drop to a mixture of 500 ccs. of absolute isopropanol and 100 grams of aluminium ethylate during one hour while stirring and cooling. Within a period of about five hours 300 to 500 ccs. of isopropanol which are continually replaced are distilled off. After removing the isopropanol, the reaction product is introduced into 500 ccs. of dilute sulfuric acid. The bromodichloroethanol formed is distilled over with steam and taken up in ether. After drying the ethereal solution and distilling off the ether, the bromo-dichloroethanol is separated from impurities by rectifying in vacuo.

The bromodichloroethanol which is obtained in a good yield boils at 63–66° C. under 8.5 mm. pressure as a colorless liquid, solidifying at +17.5° C., and is soluble in water of room temperature up to about 7%.

When using instead of 253 grams of bromodichloroacetaldehyde 312 grams of chlorodibromoacetaldehyde and proceeding correspondingly, the chlorodibromoethanol is obtained, boiling under 8 mm. pressure at 80° C. and solidifying to colorless crystals which are soluble in water of room temperature to about 5–6% and melt at about 50° C.

*Example 2.*—170 grams of bromodichloroacetaldehyde are introduced into a mixture of 90 grams of aluminium ethylate and 400 ccs. of dry benzene, while stirring. The mixture is heated to boiling for 4 hours. It is then treated with 450 ccs. of dilute sulfuric acid. The bromodichloroethanol which is obtained in a good yield is chiefly contained in the benzene layer and can be obtained in a good state of purity in accordance with the directions of Example 1.

The use of a solvent can also be avoided. In this case the starting materials are brought together while cooling and left standing for 6 hours at a temperature of 20–40° C. and 2 hours at 80° C. The reaction product is separated in the above described manner.

When replacing the bromodichloroacetaldehyde by the equimolecular quantity of chlorodibromoacetaldehyde, the chlorodibromoethanol is obtained.

Instead of the halogenated aldehydes themselves also their alcoholates or hydrates, for instance, the equimolecular quantity of chlorodibromoacetaldehydemonoisopropylacetal may be used. When employing the hydrates, preferably a larger quantity of aluminiumethylate, for instance, 155 grams, are employed.

*Example 3.*—13.1 grams of zirconiumtetrachloride are dissolved in 76.2 grams of absolute isopropanol. This solution is slowly dropped into a solution of boiling sodium isopropylate prepared from 4.76 grams of sodium and 76 grams of absolute isopropanol, whereupon sodium chloride precipitates in a finely divided form. The milky liquid is kept at the boil for some time under reflux, 96 grams of bromodichloroacetaldehyde are added and the solvent which must continually be replaced is distilled off while passing through nitrogen. Almost the theoretical quantity of acetone escapes with the solvent. After about 5 hours, the remainder of the solvent is distilled off for its greatest part, dilute sulfuric acid is added, the bromodichloroethanol which is obtained in an excellent yield is distilled off by steam and recovered from the distillate in the known manner.

*Example 4.*—A solution of 20.5 grams of bromodichloroacetaldehyde dissolved in the double volume of ether is added drop by drop to an ethereal solution of 10 grams of aluminiumtriethyletherate. An even current of ethylene is developed. The solution is then heated for a short time and the reaction mixture is decomposed with dilute sulfuric acid. The ethereal layer is separated, dried and the ether distilled off. The bromodichloroethanol remains in an excellent yield.

*Example 5.*—130 grams of bromodichloroacetaldehyde are introduced into a solution of 1 gram of aluminium chips and about 0.02 grams of iodine in 0.2 liters of isopropanol. The mixture is boiled for about 2 hours under reflux, the liquid passing the reflux condenser having a temperature of about 60–65° C. The solvent is then distilled off, the residue is introduced into dilute sulfuric acid, and the bromodichloroethanol is isolated in the above described manner.

*Example 6.*—225 parts by weight of bromomagnesium ethylate obtained by reacting with 69 parts by weight of ethyl alcohol upon 200 parts by weight of ethylmagnesium bromide are treated in ethereal solution with 192 parts by weight of bromodichloroacetaldehyde while stirring. After several hours stirring, the reaction product is treated with ice water and acidified with dilute hydrochloric acid. The ether layer is separated, washed neutral, dried and after distilling off the ether the chlorodibromoethanol is obtained from the residue in the above described manner.

*Example 7.*—7 grams of aluminium ethylate are introduced into a solution of 50 grams of bromodichloroacetaldehyde in 25 grams of benzene. The solution is heated to 75° C. for 4 hours. The reaction mixture containing beside the bromodichloroethanol also esters of this alcohol is saponified with 20 grams of ethanol, 21 grams of water and 50 grams of pure concentrated hydrochloric acid while shaking for several days. The bromodichloroethanol is separated from the reaction mixture in the above indicated manner.

We claim:—

1. In the process of preparing chloro-bromoethanols the step which comprises reacting upon an aldehyde of the formula:

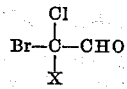

wherein X stands for chlorine or bromine, with a reducing agent selected from the group consisting of alcoholates of aluminium, zirconium and magnesium and their partially halogenated derivatives.

2. In the process of preparing chloro-bromoethanols the step which comprises reacting upon an aldehyde of the formula:

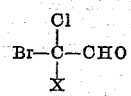

wherein X stands for chlorine or bromine, with a reducing agent selected from the group consisting of alcoholates of aluminium, zirconium and magnesium and their partially halogenated derivatives in the presence of a solvent selected from the group consisting of alcohols, ether and benzene.

3. In the process of preparing chloro-bromoethanols the step which comprises reacting upon an aldehyde of the formula:

wherein X stands for chlorine or bromine, with an aluminium alcoholate in the presence of an alcohol.

4. The process which comprises reacting upon an aldehyde of the formula:

wherein X stands for chlorine or bromine, with an aluminium alcoholate in the presence of a solvent while heating, removing the solvent by distillation, decomposing the residue by dilute mineral acid, and separating the chloro-bromo-ethanol formed by steam distillation.

5. The process which comprises reacting upon an aldehyde of the formula:

wherein X stands for chlorine or bromine, with an aluminium alcoholate in the presence of an alcohol while heating, removing the solvent by distillation, decomposing the residue by dilute mineral acid, and separating the chloro-bromo-ethanol formed by steam distillation.

6. The process which comprises reacting upon an aldehyde of the formula:

wherein X stands for chlorine or bromine, with an aluminium alcoholate in the presence of isopropanol while heating, removing the solvent by distillation, decomposing the residue by dilute mineral acid, and separating the chloro-bromo-ethanol formed by steam distillation.

7. The process which comprises reacting upon an aldehyde of the formula:

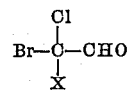

wherein X stands for chlorine or bromine, with an aluminium alcoholate in the presence of benzene while heating, removing the solvent by distillation, decomposing the residue by dilute mineral acid, and separating the chloro-bromo-ethanol formed by steam distillation.

8. The products of the formula:

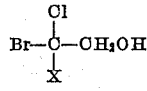

wherein X stands for chlorine or bromine, which products are crystalline substances when cold and display a narcotic action.

9. The product of the formula:

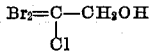

which product boils under 8 mm. pressure at 80° C. and forms whitish crystals which melt at about 50° C., dissolves in water up to about 6% and displays a narcotic action.

10. The product of the formula:

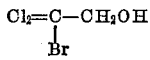

which product boils under 8.5 mm. pressure at 63–66° C. and forms whitish crystals which melt at 17.5° C., dissolves in water up to about 7%, and displays a narcotic action.

ERICH GOTH.
FRIEDRICH KAYSER.
MARTIN KÜHN.